United States Patent
Lindquist

[19]

[11] Patent Number: 5,901,541
[45] Date of Patent: May 11, 1999

[54] CORN STOVER COLLECTION APPARATUS

[76] Inventor: Dale Lindquist, 3023 15th St. SW., Willmar, Minn. 56201

[21] Appl. No.: 08/846,571

[22] Filed: Apr. 30, 1997

[51] Int. Cl.[6] .................................................... F01D 25/04
[52] U.S. Cl. ............................................... 56/504; 171/58
[58] Field of Search ...................... 56/14.4, 16.4 R–14.6, 56/504, 156, 192, 200, 376, DIG. 1, DIG. 20, DIG. 24, 193, 153, 384, 396, 366, 370; 171/24, 42, 58

[56] References Cited

U.S. PATENT DOCUMENTS

| | | | |
|---|---|---|---|
| 3,159,958 | 12/1964 | Mathews | 56/504 X |
| 3,770,064 | 11/1973 | Scarnato et al. | 56/504 X |
| 4,075,823 | 2/1978 | Rowland-Hill | 56/14.6 |
| 4,330,091 | 5/1982 | Rozeboom | 241/73 |
| 4,693,426 | 9/1987 | White | 241/18 |
| 4,796,417 | 1/1989 | van der Lely | 56/341 |
| 4,910,951 | 3/1990 | Reilly et al. | 56/376 |
| 5,660,034 | 8/1997 | Gates et al. | 56/504 |

OTHER PUBLICATIONS

M–C Shredder brochure "Shredders—Super Tough" dated Sep. 1985.
Mar., 1995 Brochure "Hiniker 5600 Flail Windrower" (Mar. 1995).

*Primary Examiner*—Thomas B. Will
*Assistant Examiner*—Robert Pezzuto
*Attorney, Agent, or Firm*—David George Johnson

[57] ABSTRACT

A windrower (1) useful for collecting stalk material from a field (43) and depositing the material In a windrow (61). The collection of dust and debris in the windrow is minimized by the use of a screen (24) located above the auger (29) which transports the cut stalk material to a discharge chute (14). The screen (24) permits lighter airborne particles to escape from the region surrounding the auger (29) before they are entrained and deposited into the windrow. A screen (47) is also placed beneath the auger (29) to permit small, dense particles to fall from the region surrounding the auger and be deposited on the ground (43). A flexible barrier (48) is placed between the auger and the cutting assembly (32) so that material falling through the screen is not reintroduced to the cutting blades (39, 42). A second barrier (64) is positioned behind the auger so as to form a volume (66) within which material is confined so that it will not become airborne. The windrower wheels (3–10) are adjustably spaced and arranged in pairs so that the number of individual wheels riding on a peak contour (56) within the field (43) is maximized.

10 Claims, 5 Drawing Sheets

CORN STOVER COLLECTION APPARATUS

FIELD OF THE INVENTION

This invention relates generally to the field of shredders and windrowers, and more specifically to a shredder adapted to collect the residue of a corn harvest while minimizing the amount of inorganic debris and organic or inorganic particulate matter deposited in the resultant windrows.

DESCRIPTION OF RELATED TECHNOLOGY

Many edible plant products are harvested by removing only the edible portion from the plant while the entire plant is still in the field. In the case of a corn plant, only the ear of corn and its protective husk are removed, while the remainder of the plant stalk, roots and leaves remain standing. Often, the corn stalks are left in the field to decay, thereby returning some nutrient value to the soil. The stalks may also be useful as animal feed or bedding, in which case the stalks and leaves are collected and compacted by a baling machine, such as is disclosed in U.S. Pat. No. 4,796,417, issued to van der Lely. When the bale is to be later used as animal bedding, the bale may be reduced by a device such as the tub chopper disclosed in U.S. Pat. No. 4,693,426, issued to White.

In order for the baler to function most efficiently, the corn stalks should ideally be separated from their roots, reduced in size, and deposited in rows prior to the arrival of the baler. This is typically accomplished by a windrower, such as the Model 5600 Flail Shredder/Windrower, manufactured by The Hiniker Company, Airport Road, Post Office Box 3407, Mankato, Minn. 56002-3407. The windrower is formed to include a plurality of knives, hammers or blades which are pivotably anchored to a rotating axle. The rotating axle is oriented to be substantially perpendicular to the intended direction of travel Of the windrower. The knives knock down the standing stalks and shred them into fragments which are transferred to a laterally extending auger or conveyor. The conveyor terminates adjacent to the ground and deposits a row of shredded and slightly compacted stalk material behind the windrower as the windrower travels across the field.

The problems with existing windrowers are several, with the primary shortcoming being that large amounts of debris are collected by the knives, transported by the auger and deposited within the row behind windrowing machine. This debris will then be collected by the baler and reduced by the chopper. In some situations, such as when the material is to be used as animal feed or as bedding, the presence of such debris is not important. However, if the corn stalk material is to be further processed for use as a building material or as pulp for papermaking, the presence of such debris can render the material completely unsuitable for its intended purpose, or require the subsequent use of expensive washing and cleaning equipment.

The types of debris that can be collected by a windrowing machine operating in the field fall into several categories. First, gross debris such as rocks, branches, bottles and cans are often picked up by the knives and hurled into the auger, where these items are easily transported into the window. A second category of debris includes primarily synthetic items that are carried by the wind into a field where they tend to become entangled and trapped near the base of the stalks. This would include paper items such as cups or newspapers, and plastic items such as bags and packaging materials. A third type of debris would be refuse from agricultural operations previously performed in the field, and might include metal shavings or fasteners, bits of wire, twine and glass particles. A final type of debris would be particulate matter such as dust, either coming from the soil in the field or being produced as a byproduct of the shredding and windrowing operation itself.

Different types of debris are introduced into the windrower by different means. Denser items such as rocks are directly impacted by the flailing blades and are thereby propelled directly onto the auger or conveyor. Lower density materials such as dust are often carried directly by air currents generated by the movement of the flailing blades and the motion of the windrower through the field. Debris also often becomes physically entangled with the desired material and is thereby ingested into the windrower.

Each of the aforementioned types of debris must be removed from the field prior to processing the crop waste into pulp or fiberboard. While some of this material will inevitably make its way into the baled material, material that is left in the field and not collected will not have to be removed at the processing plant. Prior art windrowers have not been designed with these goals in mind, and hence tend to collect large amounts of debris of all types during their normal operation.

SUMMARY OF THE INVENTION

The present invention addresses the aforementioned problems associated with existing flail windrowers by decreasing the ingestion of debris and its subsequent transportation to the windrow. The windrower of the present invention is formed generally along the lines of the Hiniker Model 5600 flail windrower, and is formed as a towed vehicle supported by a plurality of tires. The present invention positions the tires of the windrower so that they travel along the crests of the furrows in a cultivated, ridge tilled or gravity irrigated field. This causes the elevation of the laterally extending, knife bearing cylinder to be raised above the field such that the rotating knives are substantially above the highest elevation of solid earth that resides beneath the knife bearing cylinder. The knives therefore encounter only stalk material without digging into the adjacent ground as the vehicle traverses the field.

A second aspect of the present invention is the inclusion of a porous, screen like material positioned aobve a portion of the laterally extending auger. The screens are chosen to have a grid size that permits the escape of fine, smaller sized material while preventing the escape of larger particles that would induce some of the desired material. The screens may be mounted in a frame in order to permit the substitution of different screens as may be appropriate for different field or crop conditions.

A third aspect of the present invention is the use of screens or grids beneath the auger, thereby permitting smaller denser items, such as rocks, glass, dirt or metal to fall through the screen while while the desired stover material continues to be entrained by the auger.

A fourth aspect of the present invention is the use of flexible flaps or baffles positioned beneath the auger and behind the flailing knives which serves as a barrier to prevent material falling downwardly from the auger from being reingested by the flailing knives. In this manner, denser material that has already been sorted and discarded by the bottom positioned screens will not be transported by air currents into the swath of the faliling knives to be reintroduced into the auger. This not only results in a cleaner windrowed material, but also increases knife efficiency since the knives are acting on a smaller volume of material. The lifespan of the knives is increased proportionally since the amount of dense, wear producing matter encountered by the knives is decreased for a given period of time.

DETAILED DESCRIPTION OF THE INVENTION

Figure 1:
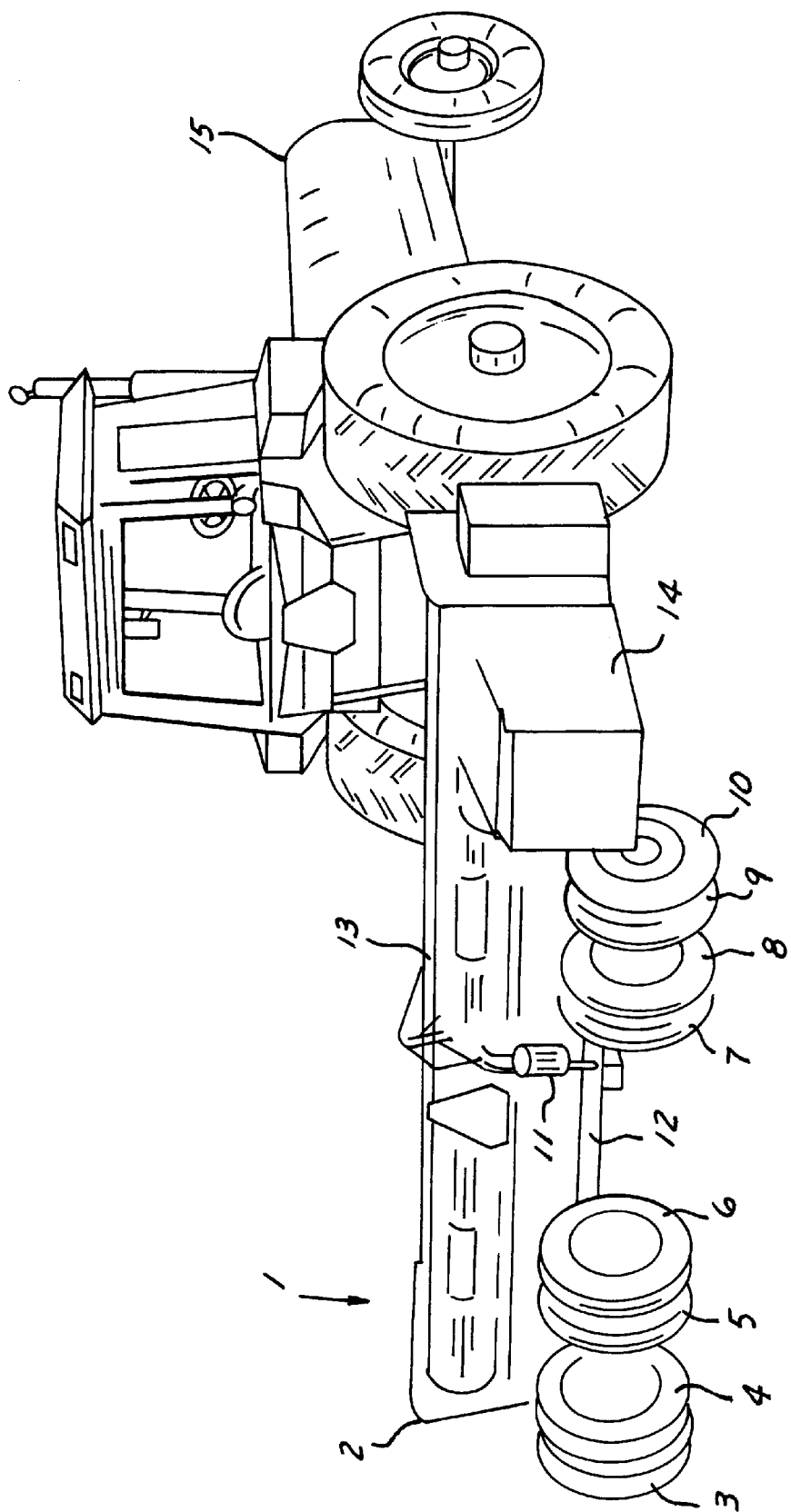
FIG. 1 is a perspective view of a windrower constructed according to the principles of the present invention.

Referring to FIG. 1, the windrower of the present invention is shown generally at 1. The windrower 1 includes a frame 2 which is supported by wheels or tires 3, 4, 5, 6, 7, 8, 9 and 10. A hydraulic ram 11 extends between rail 12 and shredder body 13 and is used to adjust the height of cut of the shredder. A discharge chute 14 is formed at one end of frame 2 and defines the opening through which shredded material is deposited so as to form a windrow. In one embodiment of the present invention, the windrower 1 is towed by a vehicle such as tractor 15, or the windrower may be formed as a single, integral vehicle having its own motor and steering mechanism.

Figure 2:
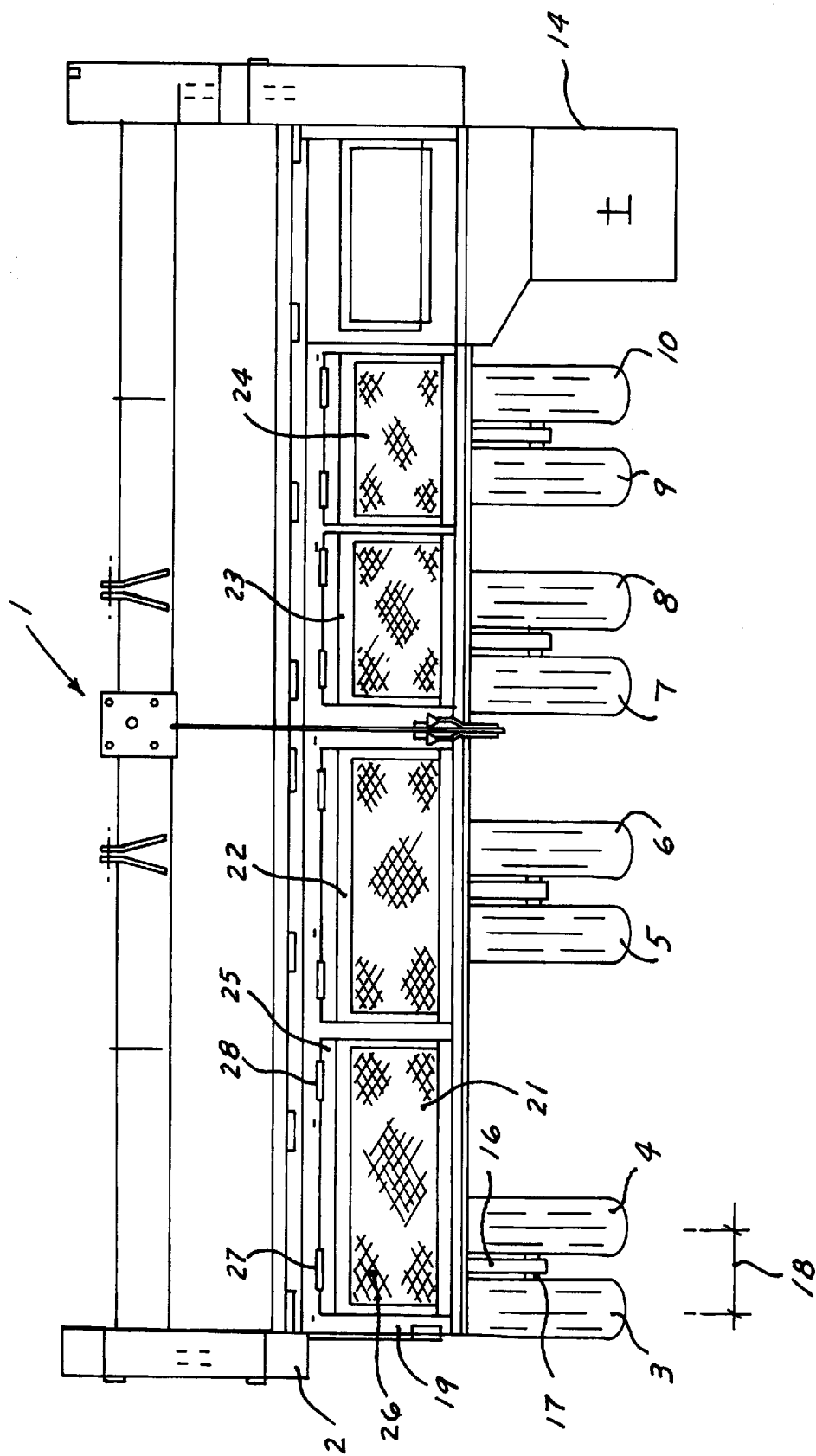
FIG. 2 is a top plan view of the windrower depicted in FIG. 1.
Figure 4:
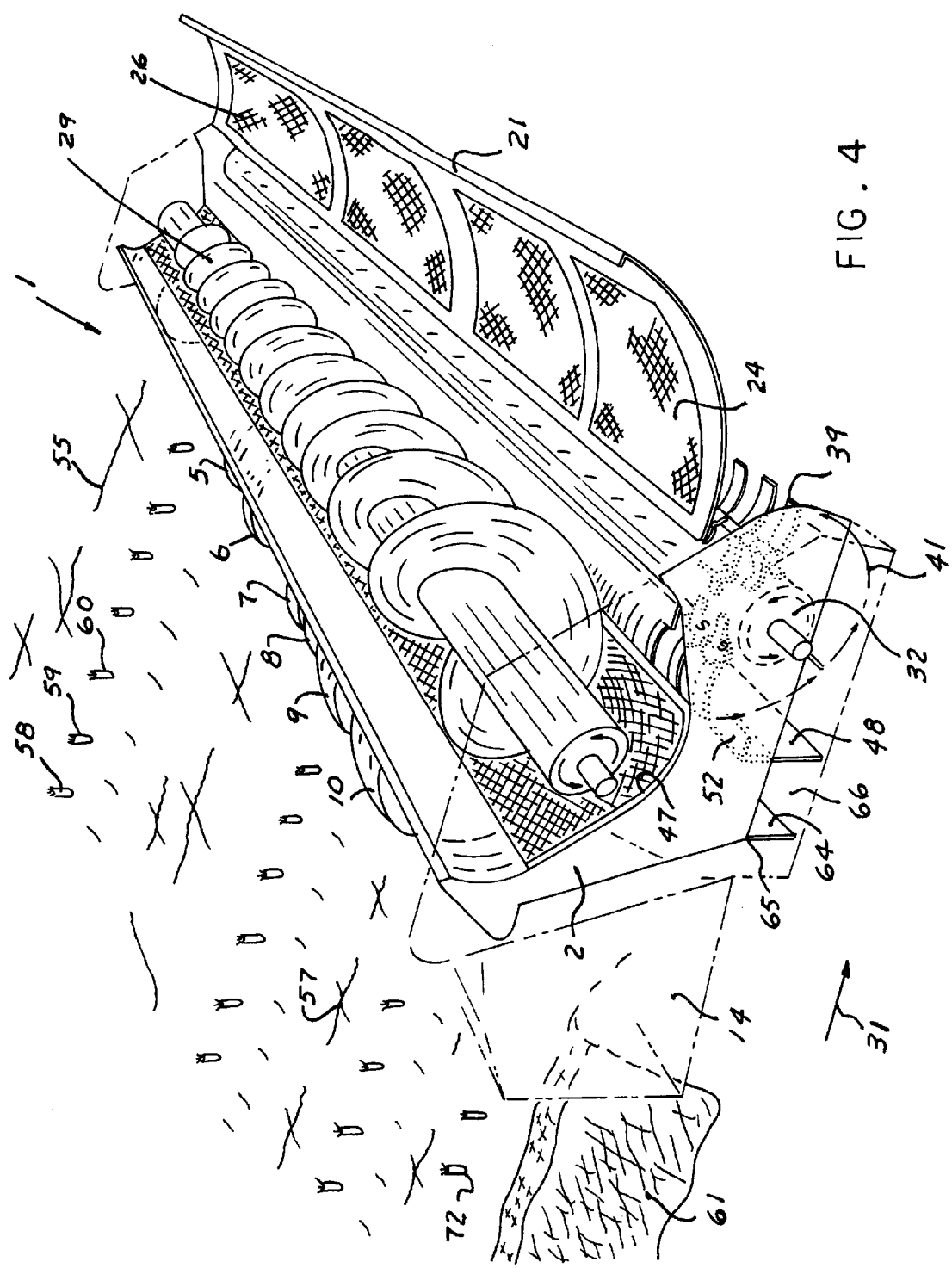
FIG. 4 is a perspective view of the windrower of FIG. 3 with some components removed for clarity.

As best seen in FIGS. 2 and 4, the wheels 3 and 4 are spaced relatively closely together to form a pair of wheels supported by arm 16 and a common axle 17. The spacing between the inner surfaces of wheels 3 and 4 is approximately three inches, resulting in a spacing 18 between the ground contact points of the tires 3 and 4 of approximately eight inches. The distance 18 may vary according to the length of axle 17 and the width of the tires 3 and 4, and is chosen so that at least one of the tires 3 or 4 will reside upon the crown or peaks 55, 56 and 57, for example, of the contour of a plowed field, even in those situations where the crown is not perfectly straight or of uniform width. Only one of the tires 3 and 4 needs to contact the ground at any given time in order to provide adequate support for the region of the windrower frame 2 that is adjacent to the wheels 3 and 4.

The wheel pair 3,4 is spaced apart from the adjacent wheel pair 5,6 by a distance sufficient to cause at least one of the wheels 5 and 6 to reside upon another peak contour 55 of the plowed field. Assuming that the field over which the windrower 1 is travelling has been uniformly plowed, the spacing between the tires 5 and 6 will be substantially equal to the spacing 18 between tires 3 and 4. Ideally there are two additional wheel pairs 7,8 and 9,10. Each wheel pair is positioned to reside on a peak contour of a plowed field. The use of four wheel pairs increases the chance that a peak contour residing between wheel pair 3,4 and wheel pair 9,10 will be encountered by either pair 5,6 or 7,8. If the peak encountered by wheels 5, 6, 7, or 8 is higher than the peaks supporting wheels 3, 4, 9 or 10, the entire frame 2 will tend to be elevated.

Also visible in FIG. 2 is a housing 19 within which a conveying auger 29 (see FIG. 4) is mounted. Above the auger 29 is are a plurality of covers 21, 22, 23 and 24. The cover 21 is formed to include a rigid frame 25 which retains an upper grille or screen 26. A pair of hinges 27 and 28 permits the tilting of the frame 25 so as to provide access to the interior of housing 19. The grille 26 is typically formed of a rigid metal mesh having regularly spaced geometric openings with an area of approximately one square inch and a longest dimension of less than one half inch. These dimensions may be varied according to the material to be windrowed, but have been found to be appropriate for the windrowing of corn stover. The criterion for choosing the opening size is to prevent the escape of the chopped corn stalk material, which will be anywhere from one inch to several feet long, while permitting the egress of smaller bits of crushed stalk, dust and other particulate material.

Figure 3:
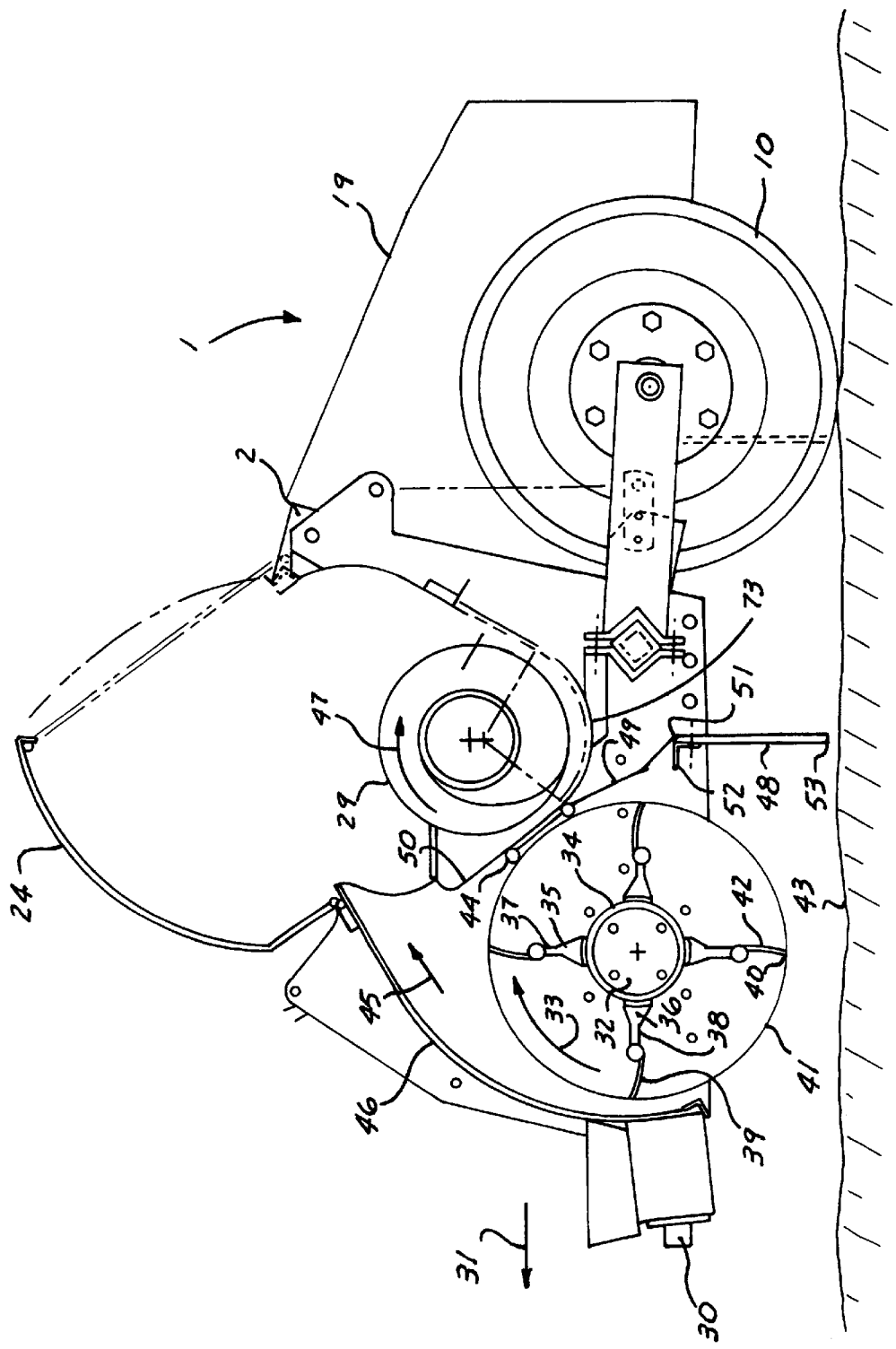
FIG. 3 is a side elevation with some components removed for clarity of the windrower depicted in FIG. 2.

The operation of the windrower can be better understood by reference to FIG. 3, which shows the cover 24 in a partially opened position, as would be the case when cleaning or inspection the auger 29. The windrower 1 includes a link or hitch 30 which is attached to the towing vehicle 15, with the combined vehicle and windrower travelling forwardly generally in the direction of arrow 31. Mounted within the windrower 1 is a shaft 32 which is connected to a motor or belt which causes rotation of the shaft 32 in the direction of arrow 33. Rigidly mounted on the surface 34 of the shaft 32 are a plurality of knife supports 35 and 36, for example, which terminate in loops or eyelets 37 and 38, respectively. Pivotably connected to loop 38, for example, is a knife or blade 39 which is free to flail as the shaft 32 rotates. The tip 40 of each blade will tend to follow the path of arc 41 when the blade 42 has acheived a steady state condition.

The goal in harvesting the corn plants 58,59 and 60, for example, is to collect as much of the stalk as possible without ingesting any dirt from the field. Therefore, the arc 41 must define a path which does not intersect the field surface 43. This is accomplished by adjusting the position of wheels 3–10 so that as many wheels as possible travel on the peaks of the plowed field surface 43 to the greatest extent possible. The height of the shaft 32 may also be adjusted directly with respect to the frame 2 as long as the arc 41 does not intersect any part of the auger housing 44.

After the corn stalk 72 is cut by knife 39, for example, the stalk travels generally in the direction of arrow 45 due partly to the velocity imparted by knife 39 and partly due to the guiding action of shroud 46. With the cover 24 closed, the cut stalks are constrained to drop into auger 29, which rotates generally in the direction of arrow 47. The cut material is transported by the auger 29 until it exits through discharge chute 14. Positioned beneath the auger 29 is a perforated lower screen or grille 73 having a plurality of small openings, typically having an area of less than one square inch. The lower screen 73 permits crushed stalk pieces and other particulate material to fall to the ground 43 instead of being transported to the windrow 61.

In order to prevent the material that falls through screen 47 from being reintroduced into the path of the blades 39 and 42, a barrier 48 is placed in a region behind the arc 41. A guide plate 49 is affixed to the auger shroud 50 and is anchored along its lower edge 51 to brace 52. The barrier 48 is formed of a flexible rubber like material and is dimensioned such that the lower edge 53 is in contact with or slightly displaced from the ground surface 43.

Several other features of the windrower 1 are best seen in FIG. 4, particularly the use of supression baffle 64. A large volume of air is transported each second due to the rotation of the blade shaft 32 and the auger 29. As a result, material falling through screen 47 may become airborne, some of which will be eventually alight in windrow 61. In order to prevent this, the suppression baffle 64 is affixed to the trailing edge 65 of frame 2. The baffle 64 is composed of a flexible rubber like material, and along with barrier 48 forms a volume 66 which confines material falling through screen 47. AS the windrower 1 moves in the direction of arrow 31, the suppression baffle 64 tends to spread fine material into the field surface 43 where it tends to remain. The baffle 64 may be formed of a more rigid material such as metal in the region immediately in front of windrow 61.

Figure 5:
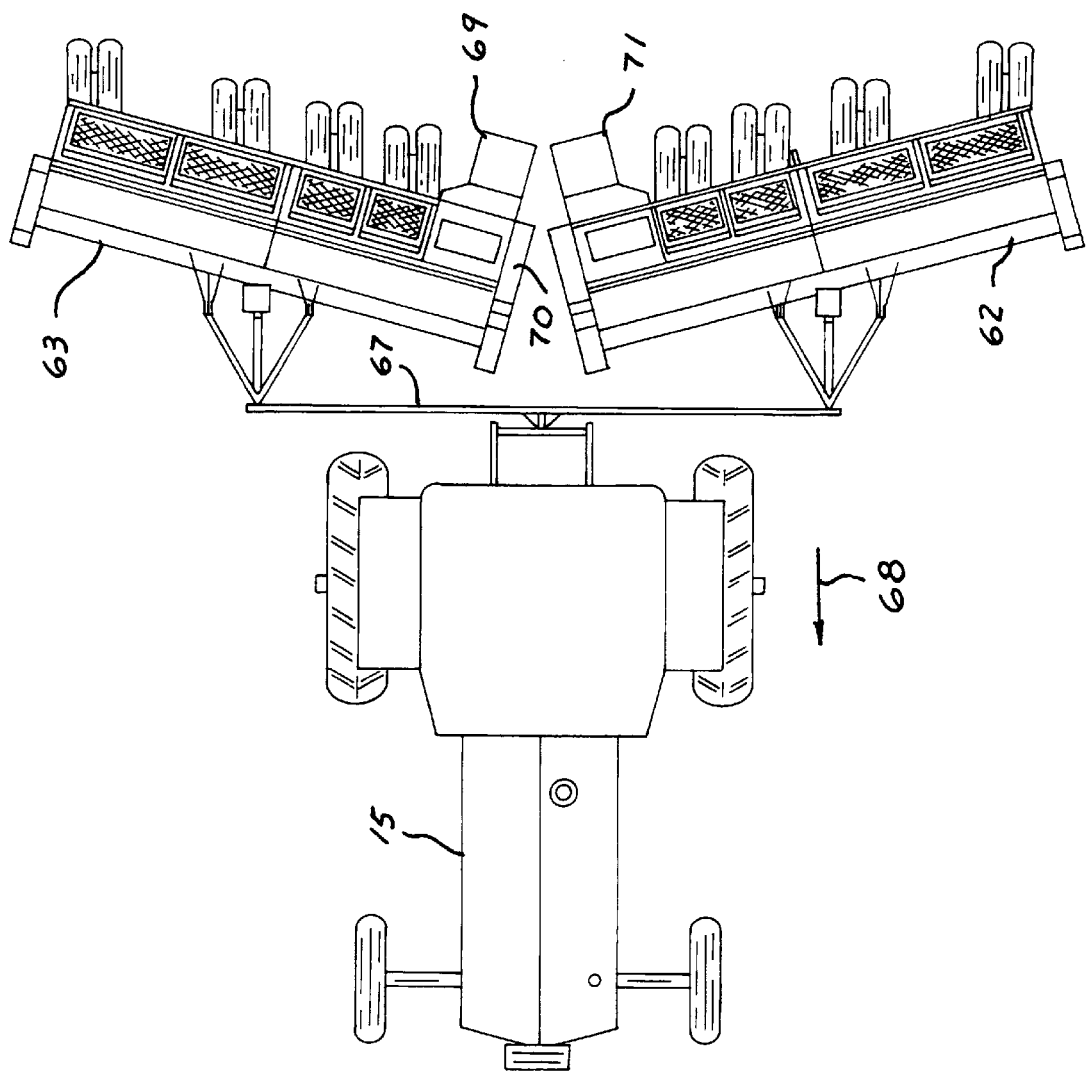
FIG. 5 is a plan view of two windrowers being towed behind a single tractor.

FIG. 5 illustrates an alternative method of using the windrowers to create a single, denser windrow. A first windrower 62 and a second windrower 63 are affixed to a common towbar 67. The towbar 67 is affixed to the tractor 15 and pulled in the direction of arrow 68. The discharge chute 69 of windrower 63 is located on the left side of frame 70, and is substantially adjacent to the discharge chute 71. In this manner, a single windrow is created while the vehicle 15 makes fewer passes through the field in a shorter period of time.

While the invention has been described with reference to these preferred embodiments, various modifications can be made wihtout departing from the spirit and scope of the invention. For example, the windrower may combined with a baling device so that the discharge chute 14 is interconnected directly to the input of the baler. In this manner a single pass through the field would create baled material, which would further reduce the amount of debris present in the collected stover material. Such a baler could be towed by the tractor 15, or could be an independently powered vehicle which follows the windrower and is close enough to permit direct capture of the cut plant stalks before they are deposited on the ground. The discharge chute 14 would preferably be relocated to the center of the windrower in this configuration.

Another family of modifications relates to the screens 26 and 47, which may be made readily removable so as to permit substitution of various orifice dimensions. The use of field replaceable screens may be appropriate in response to different field conditions. For example, a wet field may cause fine particles to accrete or clump into larger masses which might foul smaller screen openings. These and other modifications are intended to be within the scope of the appended claims.

I claim:

1. A crop collecting device, comprising:
   (a) a frame;
   (b) a cutting mechanism, the cutting mechanism being mounted to the frame, the cutting mechanism being adapted to cut crops standing in a field;
   (c) a transport mechanism, the transport mechanism being mounted to the frame, the transport mechanism being adapted to receive cut crops from the cutting mechanism;
   (d) a plurality of wheels, the wheels being affixed to the frame, each wheel being affixed to the frame at a position that causes at least one of the wheels to reside upon a peak contour of a uniformly plowed field;
   (e) a plurality of axle supporting members, each axle supporting member being rigidly affixed to the frame;
   (f) a plurality of axles, each axle being mounted on one of the axle supporting members such that two wheels are supported by each axle;
   (g) a housing, the housing being rigidly mounted to the frame, the housing having a crop inlet and a discharge outlet;
   (h) an auger, the auger being mounted within the housing, the auger receiving crops in the housing and discharging the crops through the discharge outlet;
   (i) a top cover, the top cover being formed so as to encompass an upper region of the auger, the top cover being formed to include a perforated plate, the perforated plate permitting the escape of some matter from the upper region of the auger;
   (j) a bottom cover, the bottom cover being formed so as to encompass a lower region of the auger;
   (k) a guide plate, the guide plate being rigidly attached to the frame in a region between the cutting mechanism and the housing; and
   (l) a first barrier, the first barrier having an upper edge affixed to the guide plate so as to substantially separate the cutting mechanism from the housing.

2. The crop collecting device of claim 1, wherein the first barrier is formed of a flexible material, the barrier having a free edge proximate to the field.

3. The crop collecting device of claim 2, further comprising a second barrier, the second barrier being rigidly affixed to the frame, the second barrier being spaced apart from the first barrier so as to form a substantially enclosed corridor in a region beneath the housing.

4. The crop collecting device of claim 3, wherein the second barrier is formed of a rigid material.

5. The crop collecting device of claim 4, wherein the second barrier is formed to include a free edge proximate to the field.

6. A plant shredding and windrowing device, comprising:
   (a) a rotary cutter, the rotary cutter being formed as a series of flailing blades mounted on an axle, the axle being substantially perpendicular to an intended direction of travel of the windrowing device;
   (b) an auger, the auger having a longitudinal axis that is substantially parallel to the rotary cutter axle;
   (c) a prime mover, the prime mover being interconnected to and supplying motive force to the auger and the rotary cutter;
   (d) a rigid framework, the rigid framework supporting the rotary cutter anid the auger in a fixed relationship;
   (e) a housing, the housing comprising:
      (i) a top cover, the top cover being formed as a wire mesh;
      (ii) a bottom cover, the bottom cover being formed as a wire mesh, the bottom cover permitting items having a longest dimension of less than approximately 0.5 inch to pass through the mesh; and
      (iii) a longitudinal opening, the longitudinal opening permitting fluid communication between the rotary cutter and the auger; and
   (f) a barrier, the barrier being supported by a rigid framework, the barrier being positioned between the rotary cutter and the auger, thereby preventing particulate matter passing through the bottom cover mesh from being introduced into a region surrounding the rotary cutter was inserted.

7. The plant shredding device of claim 6, wherein the barrier is formed of a flexible material.

8. A method of windrowing crop waste so as to reduce the presence of dirt and debris, comprising the steps of:
   (a) towing a rotary cutter through a field of standing plants;
   (b) depositing material cut by the rotary cutter into an auger;

(c) housing the auger within an enclosure having perforated top and bottom walls so as to permit matter smaller than a desired size to escape from a region surrounding the auger; and (d) placing a first barrier between the bottom wall of the auger housing and the rotary cutter so as to prevent material falling through the bottom wall from reaching the rotary cutter.

9. The method of claim 8, further comprising the steps of:

(a) supporting the rotary cutter and the auger within a rigid framework; and (b) mounting a plurality of wheels on the framework in locations calculated to encounter the peak contour of a surface upon which the wheels travel.

10. The method of claim 9, further comprising the step of mounting a second barrier on the frame at a location between the first barrier and the wheel so as to suppress airborne propagation of material falling through the bottom wall of the auger housing.

* * * * *